(12) United States Patent
Shah et al.

(10) Patent No.: US 10,746,242 B2
(45) Date of Patent: Aug. 18, 2020

(54) DISC BRAKE

(71) Applicant: Meritor Heavy Vehicle Braking Systems (UK) Limited, Cwmbran, Gwent (GB)

(72) Inventors: Neel Shah, Gwent (GB); Adrian Kinder, Gwent (GB)

(73) Assignee: Meritor Heavy Vehicle Braking Systems (UK) Limited, Cwmbran (GB)

(*) Notice: Subject to any disclaimer, the term of this patent is extended or adjusted under 35 U.S.C. 154(b) by 0 days.

(21) Appl. No.: 16/201,520

(22) Filed: Nov. 27, 2018

(65) Prior Publication Data
US 2019/0162258 A1 May 30, 2019

(30) Foreign Application Priority Data

Nov. 29, 2017 (EP) .................................... 17204464
Apr. 30, 2018 (EP) .................................... 18170188

(51) Int. Cl.
| F16D 65/095 | (2006.01) |
| F16D 55/226 | (2006.01) |
| F16D 55/2255 | (2006.01) |
| F16D 65/00 | (2006.01) |
| F16D 55/2265 | (2006.01) |

(Continued)

(52) U.S. Cl.
CPC ......... *F16D 65/095* (2013.01); *F16D 55/226* (2013.01); *F16D 55/2255* (2013.01); *F16D 55/2265* (2013.01); *F16D 65/0043* (2013.01); *F16D 65/0068* (2013.01); *F16D 65/092* (2013.01); *F16D 2055/0008* (2013.01); *F16D 2055/0016* (2013.01); *F16D 2055/0037* (2013.01); *F16D 2250/0084* (2013.01)

(58) Field of Classification Search
CPC .............. F16D 65/0068; F16D 65/095; F16D 2055/0016; F16D 55/2265; F16D 55/2255; F16D 55/226; F16D 65/0043; F16D 2250/0084; F16D 2055/0008; F16D 2055/0037; F16D 65/092
USPC ................ 188/73.31, 71.1, 71.8, 73.1, 73.39
See application file for complete search history.

(56) References Cited

U.S. PATENT DOCUMENTS

| 6,354,407 B1 * | 3/2002 | Heinlein ................. F16D 65/18 188/71.1 |
| 8,960,381 B2 | 2/2015 | Plantan et al. |
| 2006/0086575 A1 | 4/2006 | Niehorster |

(Continued)

FOREIGN PATENT DOCUMENTS

| DE | 102012008573 A1 | 10/2013 |
| DE | 102013100178 A1 | 7/2014 |

(Continued)

OTHER PUBLICATIONS

European Patent Office, Extended European Search Report for Application No. EP17204464.6-1012, dated May 30, 2018, 8 pages.

(Continued)

*Primary Examiner* — Pamela Rodriguez
(74) *Attorney, Agent, or Firm* — Brooks Kushman PC (57) ABSTRACT

A disc brake that includes a caliper having a housing, an actuation mechanism, and a cover plate. The cover plate is releasably mounted to an outboard facing surface of a housing of the caliper by at least one fastening member that is insertable in a generally inboard direction and removable in a generally outboard direction.

12 Claims, 8 Drawing Sheets

(51) Int. Cl.
*F16D 55/00* (2006.01)
*F16D 65/092* (2006.01)

(56) References Cited

U.S. PATENT DOCUMENTS

| | | | |
|---|---|---|---|
| 2007/0209891 | A1 | 9/2007 | Stensson et al. |
| 2014/0027214 | A1* | 1/2014 | Morris ............... F16D 65/095 |
| | | | 188/73.31 |
| 2019/0329754 | A1* | 10/2019 | Raveendrappa ...... B60T 15/024 |

FOREIGN PATENT DOCUMENTS

| | | |
|---|---|---|
| EP | 0853736 B1 | 7/1998 |
| EP | 1475551 A2 | 11/2004 |
| EP | 1610025 A1 | 12/2005 |
| EP | 1942286 A1 | 7/2008 |
| EP | 2682631 A1 | 1/2014 |
| WO | 9906725 A2 | 2/1999 |

OTHER PUBLICATIONS

European Patent Office, Extended European Search Report for Application No. EP18170188.9-1012, dated Oct. 25, 2018, 8 pages.

\* cited by examiner

DISC BRAKE

TECHNICAL FIELD

The present invention relates to a disc brake. More particularly, but not exclusively, the present invention relates to an air disc brake, and a method of assembling disc brake.

BACKGROUND

Air-actuated disc brakes, for use on heavy vehicles such as trucks and buses, have an actuation mechanism that is configured to actuate the brake and move brake pads closer to a rotor to slow the vehicle. Typically, the majority of the actuation mechanism is located within a cavity formed in a housing of a brake caliper.

Advancements in technology have resulted in more effective and reliable brake arrangements. However, these advancements have often resulted in difficulties arising during assembly of the brake.

It would be desirable to provide a disc brake that can improve the assembly process, to make the assembly process more efficient, and reduce manufacturing costs.

SUMMARY

A disc brake is provided. The disc brake comprises a caliper having a housing defining a cavity; an actuation mechanism located at least partially within the cavity of the caliper housing; and a cover plate that closes a mouth of the cavity, the mouth being adjacent a rotor of the disc brake in use, and the cover plate being releasably mounted to an outboard facing surface of the housing by at least one fastening member that is insertable in a generally inboard direction and removable in a generally outboard direction. The actuation mechanism may comprises a spreader plate for transferring force from a piston of the actuation mechanism to an inboard brake pad of the brake, the spreader plate being arranged intermediate the cover plate and the rotor in use. The spreader plate may comprise at least one bore or recess dimensioned and aligned so as to allow a tool to access the at least one fastening member to fit or remove the cover plate.

As the spreader plate has at least one recess and/or bore, a tool can access the at least one fastening member to secure the cover plate to the caliper housing or remove the cover plate again if necessary. This is of particular benefit during assembly of the brake, as a plurality of components of the actuation mechanism and/or an adjustment mechanism, and the cover plate, can be provided as a single sub-assembly that simply has to be inserted into the cavity of the housing as part of a modular assembly process, before the cover plate is mounted to the caliper by passing a tool through each recess/bore from the outboard side to fit each fastening member. This increases the efficiency of the assembly process, lowering overall manufacturing costs per unit. This arrangement also helps to prevent it being necessary to position fastening members so that they are clear of restrictive components, or to redesign components in some other way so they do not block fastening member access, for example by making them smaller. These alternative options are more difficult and costly and could result in a less than optimal design.

The spreader plate and piston may be integrally and monolithically formed from the same piece of material. This reduces the steps during assembly, as the spreader plate and piston can be provided as a single component; as part of the sub-assembly, for example.

The disc brake may comprise at least two fastening members mounting the cover plate to the outboard facing surface of the housing, one fastening member being at each opposite circumferential side of the mouth of the housing cavity, wherein the spreader plate comprises at least two bores or recesses that are dimensioned and aligned to allow a tool to access the two fastening members.

Having a fastening member either circumferential side of the mouth of the housing cavity helps to ensure an effective and reliable seal between the cover plate and the housing.

The disc brake may comprise at least one fastening member mounting the cover plate to the outboard facing surface at a location radially inward of the mouth of the housing cavity, wherein the spreader plate comprises at least one bore or recess that is dimensioned and aligned to allow a tool to access the fastening member.

The spreader plate may have a radially inner edge. Each recess may be a cut-out portion extending from the radially inner edge to allow a tool to access the fastening member mounting the cover plate to the outboard facing surface at the location radially inward of the housing cavity.

As the cut-out portions extend from the radially inner edge of the spreader plate, there is only a minimal reduction in the surface area of the spreader plate, so force from the actuation mechanism is still distributed over a large area of a backplate of the inboard brake pad when the brake is actuated.

Each bore may be at least partially circular. Each recess may be at least partially circular.

This shape enables, for example, a head of a standard bolt to pass through.

The disc brake may comprise at least one fastening member mounting the cover plate to the outboard facing surface at a location radially outward of the housing cavity. The location may also be radially outward of a radially outer edge of the spreader plate, such that no bore or recess is necessary for a tool to access the fastening member.

The spreader plate is advantageously dimensioned such that the upper two fastening members can be accessed by a tool when the brake is assembled.

The disc brake may comprise six fastening members. Two of the fastening members may be located at opposite circumferential side of the mouth of the housing cavity. Two of the fastening members may be at a location radially inward of the housing cavity. Two of the fastening members may be at a location radially outward of the housing cavity.

The disc brake may further comprise a brake carrier to transmit a braking induced torque load from the inboard brake pad to a vehicle axle or the like, wherein the spreader plate engages the carrier, such that the spreader plate is guided by the carrier when the disc brake is actuated.

The brake carrier may comprise an opening for locating the spreader plate and inboard brake pad. The opening in the brake carrier may comprise at least one generally circumferential carrier abutment. The spreader plate may have at least one corresponding circumferential engagement surface for engaging the circumferential carrier abutment on the brake carrier.

Each circumferential engagement surface of the spreader plate may be located on an extending portion that projects in a circumferential direction from the spreader plate.

As each circumferential engagement surface is only provided on a relatively small extending portion of the spreader plate, the total area that needs to be machined can remain low, minimizing manufacturing costs.

The brake carrier may comprise an opening for locating the spreader plate and inboard brake pad. The opening in the brake carrier may comprise at least one generally radial carrier abutment. The spreader plate may have at least one corresponding radial engagement surface for engaging the radial carrier abutment on the brake carrier. Each radial engagement surface of the spreader plate may be located on an extending portion that projects in a radially inward direction from the spreader plate.

Further, when each radial engagement surface is only provided on a relatively small extending portion of the spreader plate, the total area that needs to be machined can remain low, minimizing manufacturing costs.

The cover plate may comprise an opening, through which the piston extends.

This is particularly advantageous for a combined piston and spreader plate arrangement, as the cover plate can be located between the spreader plate and the outboard surface of the caliper housing.

Each fastening member may be a bolt with a profile on an outboard facing surface, to accept a tool with a compact head.

The profile could be a projecting male hex profile or a recessed female hex profile to receive an Allen key, which enable the size of each bore and/or recess to be minimized, as no extra clearance is needed to make it possible to insert a ring spanner or wrench, for example, to tighten the bolts.

A method of assembling a disc brake is also provided. The method may comprise the steps of: providing a caliper having a housing defining a cavity; locating at least part of an actuation mechanism within the cavity of the caliper housing; and closing off a mouth of the cavity with a cover plate, the mouth being adjacent a rotor of the disc brake in use, by releasably mounting the cover plate to an outboard facing surface of the housing by at inserting at least one fastening member in a generally inboard direction. The actuation mechanism may comprise a spreader plate for transferring force from a piston of the actuation mechanism to an inboard brake pad of the brake, the spreader plate being arranged intermediate the cover plate and the rotor in use. The spreader plate may comprise at least one bore or recess dimensioned and aligned so as to allow a tool to access the at least one fastening member to fit the cover plate.

As the spreader plate has at least one recess and/or bore, a tool can access the at least one fastening member to fit the cover plate to the caliper housing during assembly of the brake. Advantageously, a plurality of components of the actuation mechanism and/or an adjustment mechanism, and the cover plate, can be provided as a single sub-assembly that simply has to be inserted into the cavity of the housing as part of a modular assembly process, before the cover plate is mounted to the caliper by passing a tool through each recess/bore from the outboard side to fit each fastening member. This increases the efficiency of the assembly process, lowering overall manufacturing costs per unit. This arrangement also helps to prevent it being necessary to position fastening members so that they are clear of restrictive components, or to redesign components in some other way so they do not block fastening member access, for example by making them smaller. These alternative options are more difficult and costly and could result in a less than optimal design.

BRIEF DESCRIPTION OF THE DRAWINGS

Embodiments of the present invention will now be described, by way of example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
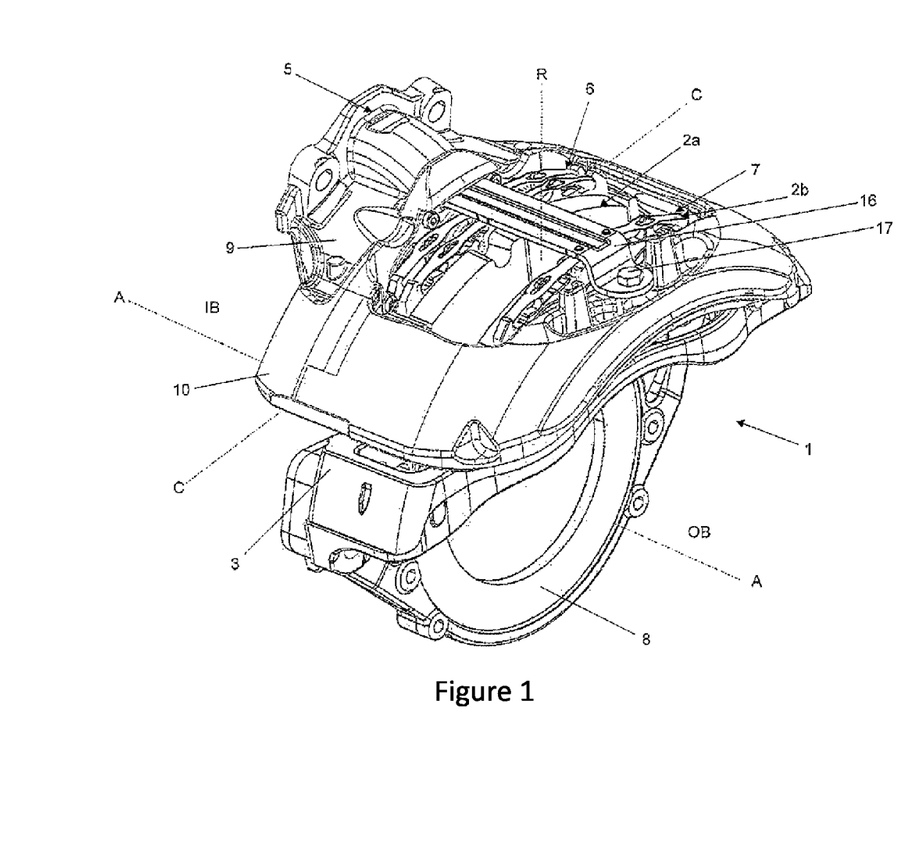
FIG. 1 is an isometric view of a disc brake, from an outboard direction, according to an embodiment of the present invention.
Figure 2:
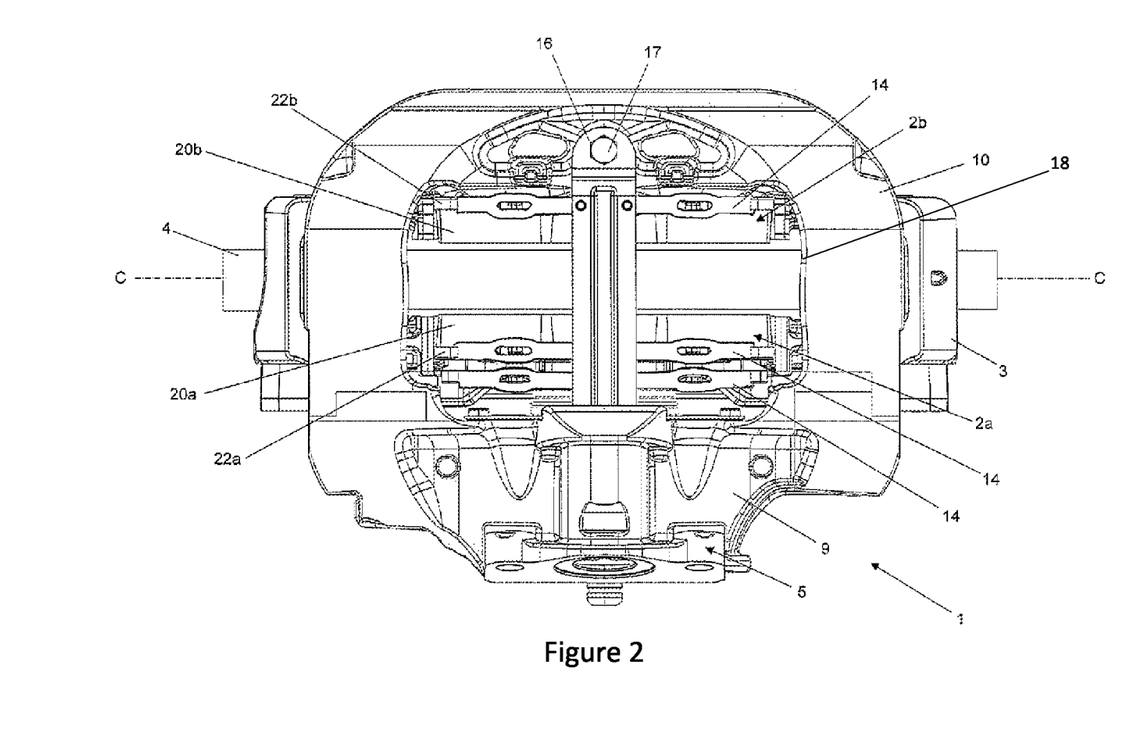
FIG. 2 is a plan view of the brake of FIG. 1.

FIGS. 1 and 2 illustrate an air-actuated disc brake 1 of the present invention. The disc brake 1 incorporates an actuation mechanism comprising a single piston suitable for a commercial vehicle. This type of brake is particularly, but not exclusively, suitable for lighter duty heavy vehicles, for example smaller trucks, or a trailer of a tractor-trailer combination.

The brake 1 includes a carrier 3 which is fixed to a torque plate 8. The torque plate 8 is fixed to an axle or steering knuckle (not shown) of a vehicle in use. The brake 1 has first and second brake pad mounting structures in the form of "windows" or radial openings 6, 7 for receiving identical inboard and outboard brake pads 2a, 2b. As can be seen most clearly from FIG. 3, in this embodiment, the inboard and outboard openings 6, 7 are located in the carrier 3.

The carrier 3 straddles a brake disc or rotor 4 mounted for rotation about an axis A-A with a wheel to be braked (not shown). The carrier is fixed to a torque plate 8. The outboard direction is indicated by OB and inboard by IB. Axis R-R indicates a radial axis extending through the centre of the rotor 4 parallel to a direction for removal or installation of inboard and outboard brake pads 2a, 2b. Axis C-C indicates a circumferential direction normal to both axis A-A and axis R.

Various orientations of the disc brake 1 are described. In particular the directions inboard and outboard refer to the typical orientation of the disc brake when fitted to a vehicle. In this orientation the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms radial, circumferential, tangential and chordal describe orientations with respect to the brake rotor. The terms vertical and horizontal describe orientations with the disc brake mounted uppermost on an axle, whereas it will be appreciated that in use such a disc brake may adopt any axle orientation depending upon packaging requirements of the vehicle.

The brake further comprises a caliper 10 slidably mounted on the carrier 3 for movement along axis A-A. The caliper 10 also straddles the rotor 4 and applies a clamp load to apply the brake and slow rotation of the wheel.

Figure 3:
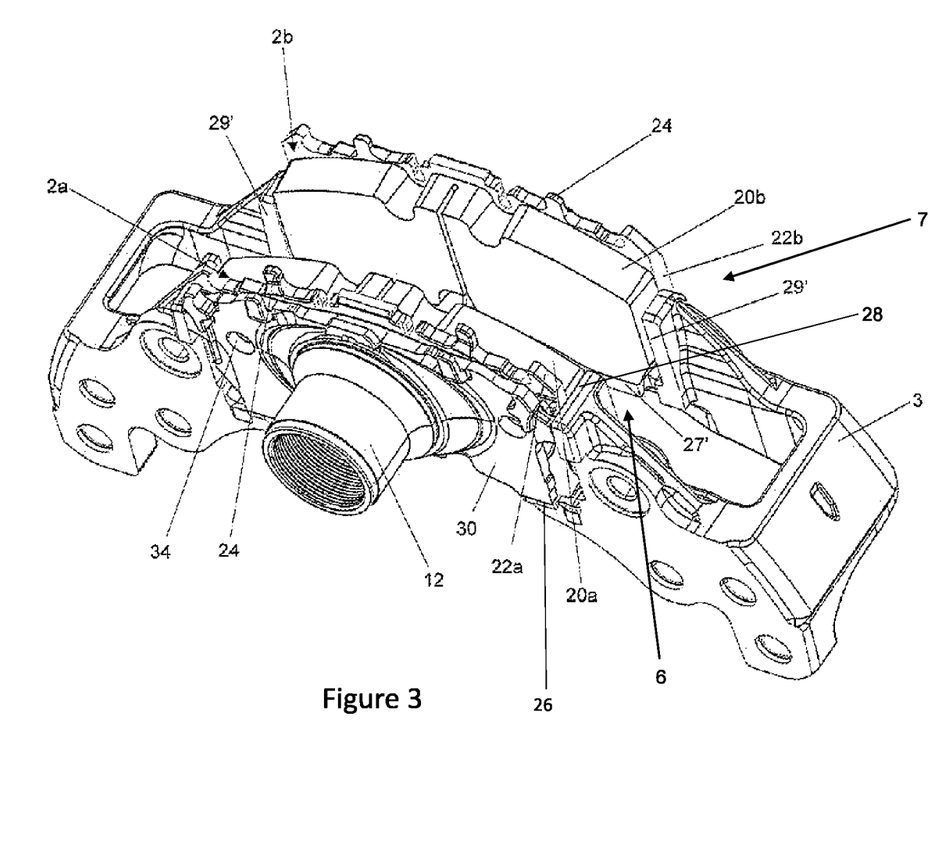
FIG. 3 is an isometric view of the carrier, inboard and outboard brake pads, spreader plate and outer piston portion of the disc brake of FIG. 1, from an inboard direction.
Figure 4:
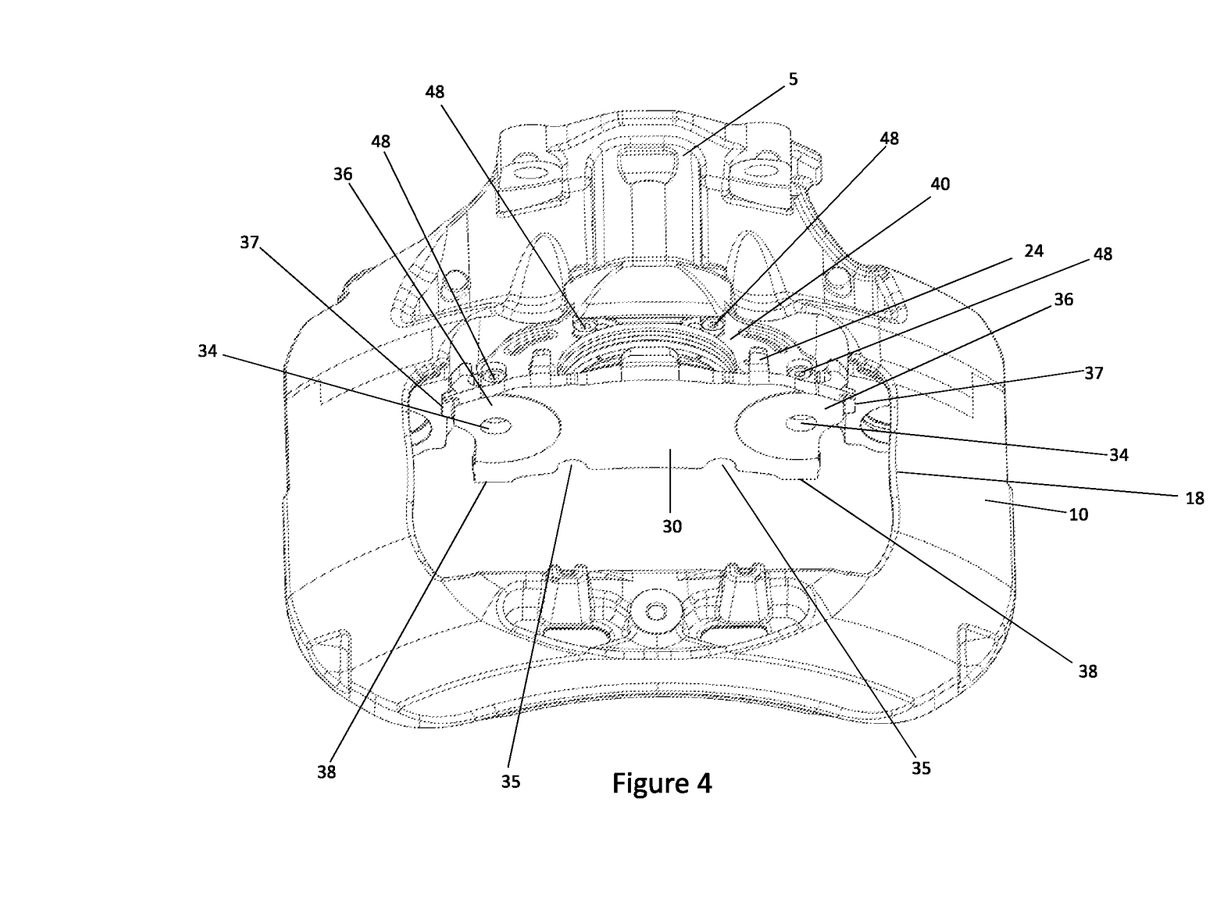
FIG. 4 is an isometric view of the brake of FIG. 1, with the rotor, inboard brake pad, and outboard brake pad omitted for clarity.

An actuation mechanism of the brake 1 is indicated generally at 5 in FIGS. 1 and 2 and of any suitable type known in the art. The actuation mechanism 5 is mounted within a housing 9 of the caliper 10. The housing 9 is adapted to mount a conventional air or other power actuator—e.g., an electromechanical actuator (not shown) on an external face thereof. An actuating lever (not shown) may perform an angular reciprocal swinging movement under the action of a thrust member of the power actuator, the lever being integral or attached to a rotary actuating member (commonly referred to as an operating shaft) which is rotatably supported within the caliper. The operating shaft pivots on cylindrical rollers, the longitudinal axes of which are offset from the rotary axis of the operating shaft and form an eccentric actuating arrangement. A curved outboard surface of the operating shaft bears against a yoke 19, which is arranged such that it can linearly actuate to engage a thrust assembly, in this case an adjustable single piston assembly (a piston is also sometimes referred to as a tappet in the art). FIG. 3 shows a portion of the piston assembly, an outer piston 12, which has a threaded inner surface, which enables the piston to be extended when required, to close the distance between the brake pads 2a, 2b and the rotor 4 and thereby maintain a suitable running clearance between the brake pads and rotor as friction material of the brake pads wears.

In this embodiment, the outer piston 12 is integral with a spreader plate 30, i.e., the outer piston 12 and spreader plate 30 are monolithically cast as a single component. The spreader plate 30 engages the backplate 22a of the inboard brake pad 2a, as well as machined radial and circumferential abutment surfaces 26, 28 of the carrier 3 (shown in FIG. 3). Therefore, the interaction of the spreader plate 30 and carrier 3 prevent rotation of the outer piston 12 in use, and the spreader plate 30 is guided by the carrier 3 during a brake actuation operation.

In this embodiment, the spreader plate 30 is generally rectangular and generally planar, with a greater surface area than the cross-sectional area of the outer piston 12. The spreader plate 30 has circumferential, radially inner and radially outer edges. Each circumferential edge includes an extending portion that has a circumferential engagement surface 37 for engaging the circumferential carrier abutments 28. The radially inner edge includes two extending portions adjacent the circumferential edges. Each extending portion has a radial engagement surface 38 for engaging the radial carrier abutments 26. Typically, the circumferential and radial engagement surfaces 37, 38 are machined, such that the spreader plate 30 can slide on these surfaces relative to the carrier 3. As the circumferential and radial engagement surfaces 37, 38 are only provided on relatively small extending portions of the spreader plate 30, the total area that needs to be machined can remain low, keeping manufacturing costs as minimal as possible. The radially inner edge of the spreader plate 30 also includes at least one recess. In this embodiment, there are two recesses, which are semi-circular cut-out portions 35 that extend from the radially inner edge of the spreader plate 30 (the function of the cut-outs 35 is described in more detail below).

The main function of the spreader plate 30 is to spread the load applied by the single piston across the circumferential width of the inboard pad 2a, which is particularly useful for high pressure applications (e.g., stopping a vehicle at high speed), to more evenly distribute the load applied to the pads, and help prevent brake fade. There is also an effect on wear; i.e., wear closer to the center of the pad (where the piston is applied) can be reduced, to provide a more even distribution of wear.

In this embodiment, the spreader plate 30 has two bores 34, surrounded by raised portions 36. Each bore 34 is circular in shape in this embodiment. The bores 34 and raised portions 36 are arranged to be adjacent the circumferential edges of the spreader plate 30 (the function of the bores 34 is described in more detail below). The raised portions 36 project in an outboard direction to act as pad contact surfaces, for the inboard pad 2a. The recessed remaining outboard surface (in line with the piston) of the spreader plate 30 is intended to be for emergency braking only. In other words, in normal operation only the raised portions 36 are in contact with the brake pad 2a, but in an emergency braking operation the brake pad 2a will flex to a limited degree and contact will also occur in the center of the spreader plate 30, to help provide a stronger braking force.

To actuate the brake 1, rotation of the lever and the connected operating shaft causes actuating thrust to be applied parallel to axis A-A via the piston assembly to the spreader plate 30. This spreads the load across the backplate 22a of the brake pad 2a (i.e., so it is directly actuated) and, by reaction via the caliper 10, to the outboard brake pad 2b (which is indirectly actuated). The brake pads 2a, 2b are mounted so as to face respective sides of the rotor 4. The carrier 3 restrains the brake pads from circumferential movement in direction C and radial inward movement along axis R. Radial movement outward along axis R is restricted by pad springs 14 and a pad retainer 16. As can be seen most clearly from FIG. 2, the caliper 10 has an aperture 18, through which the brake pads 2a, 2b can be inserted and removed in the radial direction R. This enables the brake pads 2a, 2b to be inserted and removed even while the brake 1 is still installed on a wheel, i.e., the rotor 4 is still in place.

An adjustment mechanism is located within the housing 9 and may be of any appropriate conventional type needing no detailed description. The adjustment mechanism responds to excessive movement of the inboard brake pad 2a (e.g., due to wear of the friction material 20a, 20b of the brake pads 2a, 2b, and/or wear of the rotor 4 in use—described in more detail below) and produces resultant rotation of an inner piston 13 relative to the outer piston 12 (which is restricted from rotation by the engagement with the carrier 3), to extend the piston assembly and move the brake pads 2a, 2b closer to the rotor. Other force transmission devices are known, but operate using similar principles, and the present invention remains applicable thereto. Certain known force transmission devices use a double piston assembly, rather than a single piston assembly, and could also be used with the present invention.

In this embodiment, the inboard and outboard brake pads 2a, 2b are substantially similar. Each brake pad 2a, 2b comprises a substantially planar cast iron backplate 22a, 22b of a generally rectangular shape and having a typical thickness of around 9-10 mm. In other embodiments stamped steel backplates having a typical thickness of around 6 mm (e.g 5-8 mm) may instead be used. In other embodiments, even thinner backplates may be used (e.g., 2-3 mm). The backplates 22a, 22b have suitable pad spring holding formations 24 for fixing the pad springs 14 thereto. In this embodiment, the spreader plate 30 also has pad spring holding formations 24. In alternative embodiments (not shown), the pad springs may fixed to the pad retainer instead.

Friction material 20a, 20b is fixed to the inboard and outboard brake pads 2a, 2b using a suitable mechanical keying arrangement. The friction material typically has a thickness of around 15-20 mm initially, and the pad is typically considered fully worn and in need of replacement when only 2 mm of material remains (although this minimum threshold cannot always be guaranteed to be followed in the field).

Figure 7:
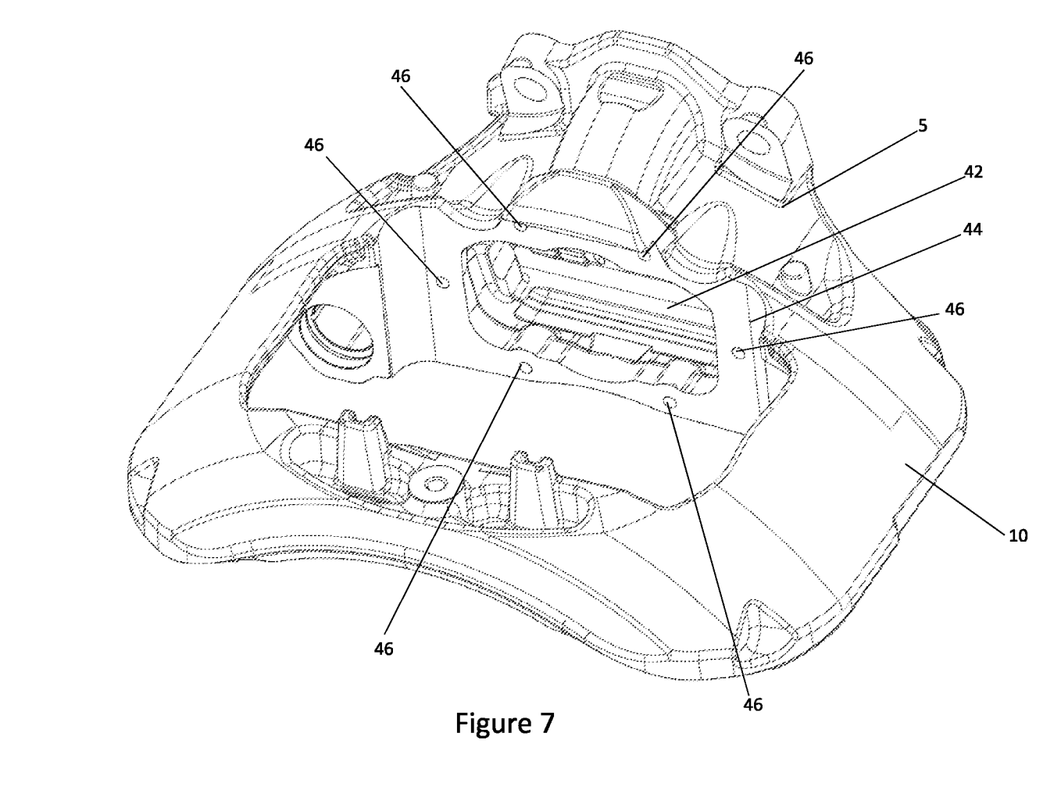
FIGS. 7-9 are isometric views that illustrate three stages of assembling the disc brake of FIG. 1.
Figure 8:
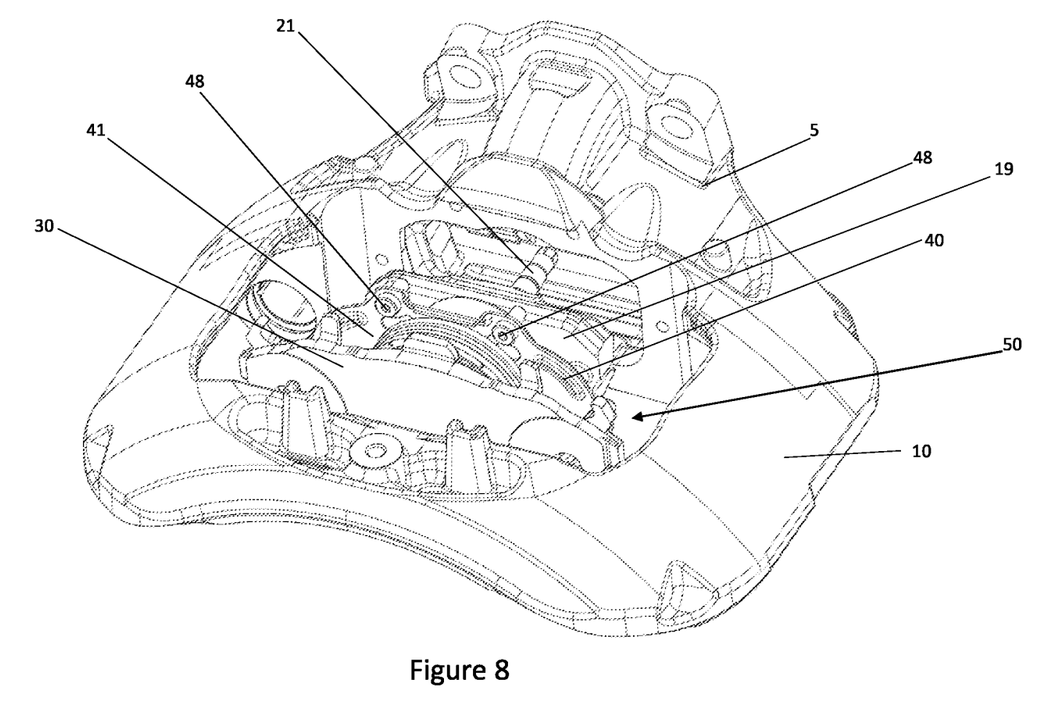
Figure 9:
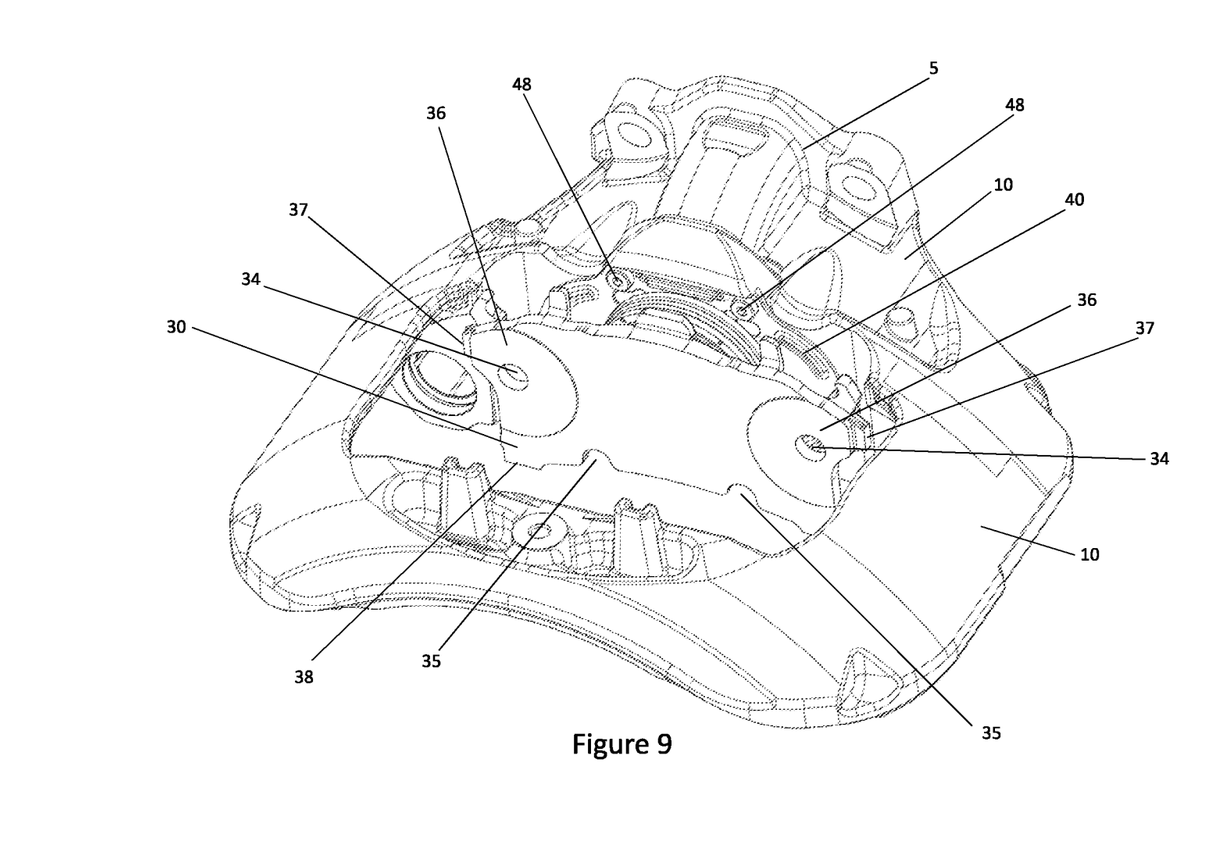

FIGS. 7 to 9 illustrate how the brake 1 is assembled. FIG. 7 shows the brake caliper 10 and the housing 9 of the brake caliper. The housing 9 has a cavity 42, with a mouth 44 at its outboard end, so the mouth 44 is adjacent the rotor 4, when the brake 1 is in use. Surrounding the mouth 44, in an outboard facing surface of the housing 9, are a plurality of threaded apertures 46. In this embodiment, there is one aperture 46 located at each opposite circumferential side of the mouth 44 of the housing cavity 42. There are also two apertures 46 at a location radially inward of the mouth 44 of the housing cavity 42. Finally, there are two apertures 46 at a location radially outward of the mouth 44 of the housing cavity 42. Each aperture 46 is configured to accept a fastening member 48, so that a cover plate 40 can be releasably mounted to the outboard facing surface of the housing 9. In this embodiment, the cover plate 40 is generally elliptical, with a central opening 41 dimensioned such that the piston of the actuation mechanism extends through the opening 41 when the brake 1 is assembled. This is particularly advantageous in this embodiment, when the outer piston 12 and the spreader plate 30 are integrally and monolithically formed from the same piece of material, as the combined piston and spreader plate can actuate through the opening 41 of the cover plate 40. The cover plate can be located between the spreader plate and the outboard surface of the caliper housing 9.

In this embodiment, each fastening member 48 is a bolt, but it will be appreciated that any suitable type of fastening member can be used. Each fastening member 48 is therefore insertable in a generally inboard direction and removable in a generally outboard direction. In this way, the cover plate 40 can close the mouth 44 of the housing cavity 42.

As shown most clearly in FIG. 8, to assemble the brake 1, a plurality of components of the actuation mechanism and adjustment mechanism, and the cover plate 40, are provided as a sub-assembly 50 before at least a part of the sub-assembly 50 is inserted through the mouth 44 and into the housing cavity 42 in an inboard direction. In this embodiment, the sub-assembly 50 is shown to comprise at least the spreader plate 30, the cover plate 40, the fastening members 48, the yoke 19, and a manual rewind shaft 21 (which can be engaged and rotated to manually rewind the adjustment mechanism). It will be appreciated that in other embodiments, the sub-assembly 50 could include more or fewer components of the adjustment mechanism and/or the actuation mechanism. Advantageously, providing a number of components as a sub-assembly in this way increases the efficiency of the assembly process, lowering overall manufacturing costs per unit.

Figures 5, 6:
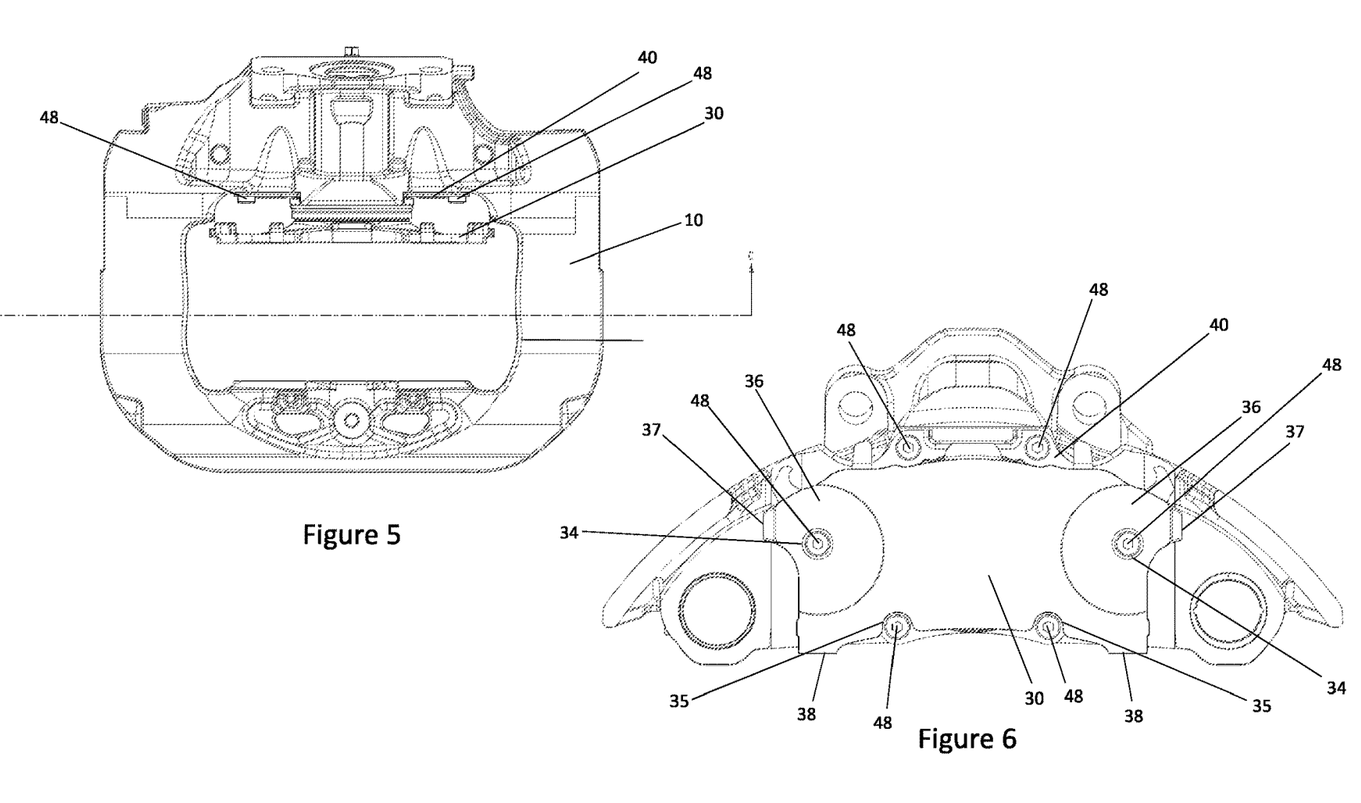
FIG. 5 is a plan view of the brake of FIG. 1, with the rotor, inboard brake pad, and outboard brake pad omitted for clarity.
FIG. 6 is a cross-sectional view through a radial plane C-C of the disc brake, as shown in FIG. 5.

As will be understood from FIG. 9 (as well as the front view of FIG. 6), when the cover plate 40 is in place against the outboard surface of the housing 9, the spreader plate 30 is arranged intermediate the cover plate 40 and the rotor 4 such that, normally, it would not be possible to access the fastening members 48 to fix the cover plate 40 to the housing 9. Specifically, in this embodiment, the shape of the spreader plate 30 would result in it normally not being possible to access the fastening members 48 located in the apertures 46 located at each opposite circumferential side of the mouth 44 of the housing cavity 42. It would also not normally be possible to access the fastening members 48 located in the two apertures 46 at the location radially inward of the mouth 44 of the housing cavity 42. In this embodiment, only the fastening members 48 located in the apertures 46 at the location radially outward of the mouth 44 of the housing cavity 42 could be accessed, as they are located radially outward of the radially outer edge of the spreader plate 30, which would not be satisfactory to securely mount the cover plate 40.

Therefore, it would be expected by a skilled person in the field that including the spreader plate 30 as a component of the sub-assembly 50 would result in difficult or even impossible assembly, as the spreader plate 30 would, in effect, block access to the fastening members 48 and inhibit or prevent the cover plate 40 from being installed. This is a particular issue with the current arrangement, in which there is a combined piston and spreader plate, making assembly particularly difficult. However, the inventors of the current invention have recognized that there is a way to include the spreader plate 30 in the sub-assembly 50, and benefit from the significant increase in efficiency of a modular assembly process.

As mentioned earlier, the inventors have recognized that by modifying the spreader plate 30 to include the bores 34 and the cut-outs 35, provided the bores 34 and cut-outs 35 are dimensioned and aligned so as to allow a tool to access the fastening members 48, the spreader plate 30 can be included in the sub-assembly 50. An example distribution can be seen most clearly in the front view of FIG. 6. This arrangement, with two fastening members 48 above the mouth 44 of the housing cavity 42, two fastening members 48 below the mouth 44 of the housing cavity 42, and one fastening member on either circumferential side of the mouth 44 of the housing cavity 42 has been found to be particularly effective in helping to ensure an effective and reliable seal between the cover plate 40 and the outboard surface of the housing 9. It will be appreciated, however, that other suitable distributions of fastening members 48 could be used to mount the cover plate 40 to the outboard surface of the housing 9. In other words, the arrangement and number of bores 34 and/or cut-outs 35 can be adjusted as necessary to match the arrangement of the fastening members 48, as long as each bore 34 and/or cut-out 35 is dimensioned and aligned to allow a tool to access the corresponding fastening member 48.

If bolts are used as the fastening members 48, the semi-circular shape of the cut-outs 35 and the circular shape of the bores 34 allows a head of a standard bolt to pass through. Further, if bolts are used that can accept a tool with a compact head, e.g., if the bolts have a profile on an outboard surface, such as a projecting male hex profile or a recessed female hex profile to receive an Allen key (see the fastening members 48 of FIG. 6, for an example of the female profile), the size of each bore 34 and/or cut-out 35 can be minimized, as no extra clearance is needed to make it possible to insert a ring spanner or wrench, for example, to tighten the bolts.

It will be appreciated that the cut-outs 35 and the bores 34 can be any other suitable shape, depending on the type of fastening member 48 that is used.

It will be appreciated that numerous other changes may be made within the scope of the present invention. For example, certain aspects of the invention may be applicable to other types of brake, such as twin piston or electromechanically actuated brakes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake comprising:
   a caliper having a housing defining a cavity;
   an actuation mechanism located at least partially within the cavity; and
   a cover plate that closes a mouth of the cavity, the mouth being adjacent a rotor of the disc brake in use, and the cover plate being releasably mounted to an outboard facing surface of the housing by a fastening member that is insertable in a generally inboard direction and removable in a generally outboard direction; and
   a brake carrier to transmit a braking induced torque load from an inboard brake pad of the disc brake to a vehicle axle;
   wherein the actuation mechanism comprises a spreader plate for transferring force from a piston of the actuation mechanism to the inboard brake pad of the disc brake, the spreader plate being arranged intermediate the cover plate and the rotor in use;
   wherein the spreader plate comprises at least one bore or recess dimensioned and aligned so as to allow a tool to access the fastening member to fit or remove the cover plate;
   wherein the spreader plate and piston are integrally and monolithically formed from the same piece of material;
   wherein the cover plate comprises an opening, through which the piston extends, and
   wherein the spreader plate engages the disc brake carrier, such that the spreader plate is guided by the brake carrier when the disc brake is actuated.

2. The disc brake of claim 1 further comprising a second fastening member that mounts the cover plate to the outboard facing surface of the housing, wherein the fastening member and the second fastening member are disposed at opposite circumferential sides of the mouth of the cavity, wherein the spreader plate comprises at least two bores or recesses that are dimensioned and aligned to allow the tool to access the fastening member and the second fastening member.

3. The disc brake of claim 1 wherein the fastening member is positioned at a location radially inward of the mouth of the cavity.

4. The disc brake of claim 3 wherein the spreader plate has a radially inner edge, and the recess is a cut-out portion extending from the radially inner edge to allow the tool to access the fastening member that mounts the cover plate to the outboard facing surface at the location radially inward of the cavity.

5. The disc brake of claim 1 wherein the bore or recess is at least partially circular.

6. The disc brake of claim 1 further comprising six fastening members, wherein two of the fastening members are located at opposite circumferential side of the mouth of the cavity, two of the fastening members are at a location radially inward of the cavity, and two of the fastening members are at a location radially outward of the cavity.

7. The disc brake of claim 1 wherein the brake carrier comprises an opening for locating the spreader plate and inboard brake pad, wherein the opening in the brake carrier comprises at least one generally circumferential carrier abutment and wherein the spreader plate has at least one corresponding circumferential engagement surface for engaging the circumferential carrier abutment on the brake carrier.

8. The disc brake of claim 7 wherein the circumferential engagement surface of the spreader plate is located on an extending portion that projects in a circumferential direction from the spreader plate.

9. The disc brake of claim 1 wherein the brake carrier comprises an opening for locating the spreader plate and inboard brake pad, wherein the opening in the brake carrier comprises at least one generally radial carrier abutment and wherein the spreader plate has at least one corresponding radial engagement surface for engaging the radial carrier abutment on the brake carrier.

10. The disc brake of claim 9 wherein the radial engagement surface of the spreader plate is located on an extending portion that projects in a radially inward direction from the spreader plate.

11. The disc brake of claim 1 wherein the fastening member is a bolt with a profile on the outboard facing surface to accept the tool, the tool having a compact head.

12. A method of assembling a disc brake comprising:
    providing a caliper having a housing defining a cavity;
    locating at least part of an actuation mechanism within the cavity; and
    closing off a mouth of the cavity with a cover plate, the mouth being adjacent a rotor of the disc brake in use, by releasably mounting the cover plate to an outboard facing surface of the housing by at inserting at least one fastening member in a generally inboard direction;
    wherein the actuation mechanism comprises a spreader plate for transferring force from a piston of the actuation mechanism to an inboard brake pad of the disc brake, the spreader plate being arranged intermediate the cover plate and the rotor in use;
    wherein the spreader plate comprises at least one bore or recess dimensioned and aligned so as to allow a tool to access the fastening member to fit the cover plate;
    wherein the spreader plate and piston are integrally and monolithically formed from the same piece of material;
    wherein the cover plate comprises an opening, through which a piston extends; and
    wherein the spreader plate engages a brake carrier, in use, for transmitting a braking induced torque load from the inboard brake ad to a vehicle axle, such that the spreader plate is guided by the brake carrier when the disc brake is actuated.

* * * * *

UNITED STATES PATENT AND TRADEMARK OFFICE
CERTIFICATE OF CORRECTION

PATENT NO. : 10,746,242 B2
APPLICATION NO. : 16/201520
DATED : August 18, 2020
INVENTOR(S) : Neel Shah et al.

Page 1 of 1

It is certified that error appears in the above-identified patent and that said Letters Patent is hereby corrected as shown below:

In the Claims

Column 10, Line 5, Claim 6:
After "are located at opposite circumferential"
Delete "side" and
Insert -- sides --.

Column 10, Line 41, Claim 12:
After "surface of the housing by"
Delete "at"

Column 10, Line 57, Claim 12:
After "inboard brake"
Delete "ad" and
Insert -- pad --.

Signed and Sealed this
Twenty-second Day of December, 2020

Andrei Iancu
*Director of the United States Patent and Trademark Office*